United States Patent
Vaidyanathan

(12)
(10) Patent No.: US 6,790,243 B2
(45) Date of Patent: Sep. 14, 2004

(54) LITHIUM-ION CELL AND METHOD FOR ACTIVATION THEREOF

(75) Inventor: Hariharan Vaidyanathan, North Potomac, MD (US)

(73) Assignee: Comsat Corporation, Bethesda, MD (US)

(*) Notice: Subject to any disclaimer, the term of this patent is extended or adjusted under 35 U.S.C. 154(b) by 347 days.

(21) Appl. No.: 09/958,529

(22) PCT Filed: Feb. 9, 2001

(86) PCT No.: PCT/US01/00689

§ 371 (c)(1),
(2), (4) Date: Jan. 7, 2002

(87) PCT Pub. No.: WO01/59860

PCT Pub. Date: Aug. 16, 2001

(65) Prior Publication Data

US 2002/0160253 A1 Oct. 31, 2002

Related U.S. Application Data

(60) Provisional application No. 60/181,733, filed on Feb. 11, 2000.

(51) Int. Cl.$^7$ .................. H01M 6/00; H01M 10/44; H01M 4/58; H02J 7/00

(52) U.S. Cl. .................. 29/623.1; 429/52; 429/231.95; 320/160

(58) Field of Search .............. 429/52, 231.95; 320/128, 155, 160; 29/623.1

(56) References Cited

U.S. PATENT DOCUMENTS 5,948,569 A * 9/1999 Moses et al. ............... 429/246

* cited by examiner

Primary Examiner—Patrick Ryan
Assistant Examiner—Thomas H. Parsons
(74) Attorney, Agent, or Firm—Sughrue Mion, PLLC

(57) ABSTRACT

A lithium-ion cell includes a carbonaceous anode and a lithiated metal oxide cathode, with a plastic spacer therebetween and liquid electrolyte containing lithium salts. The cell stands for a period of time aller electrolyte is added. The cell is then charged at a first current density of about ¼ mA/cm$^2$ for at least an hour. Following the first charge, the cell stands open-circuited for at least an hour. The cell is again charged, at a current density significantly greater than the first current density, until the cell reaches a particular voltage which corresponds with the desired cell capacity, and gases are vented. After the second charge, the cell is discharged at a relatively high current density toward a particular voltage, so as to leave less active lithium ions in the anode structure. After discharge, the lithium ion cell is sealed and ready for charging by a user.

17 Claims, 1 Drawing Sheet

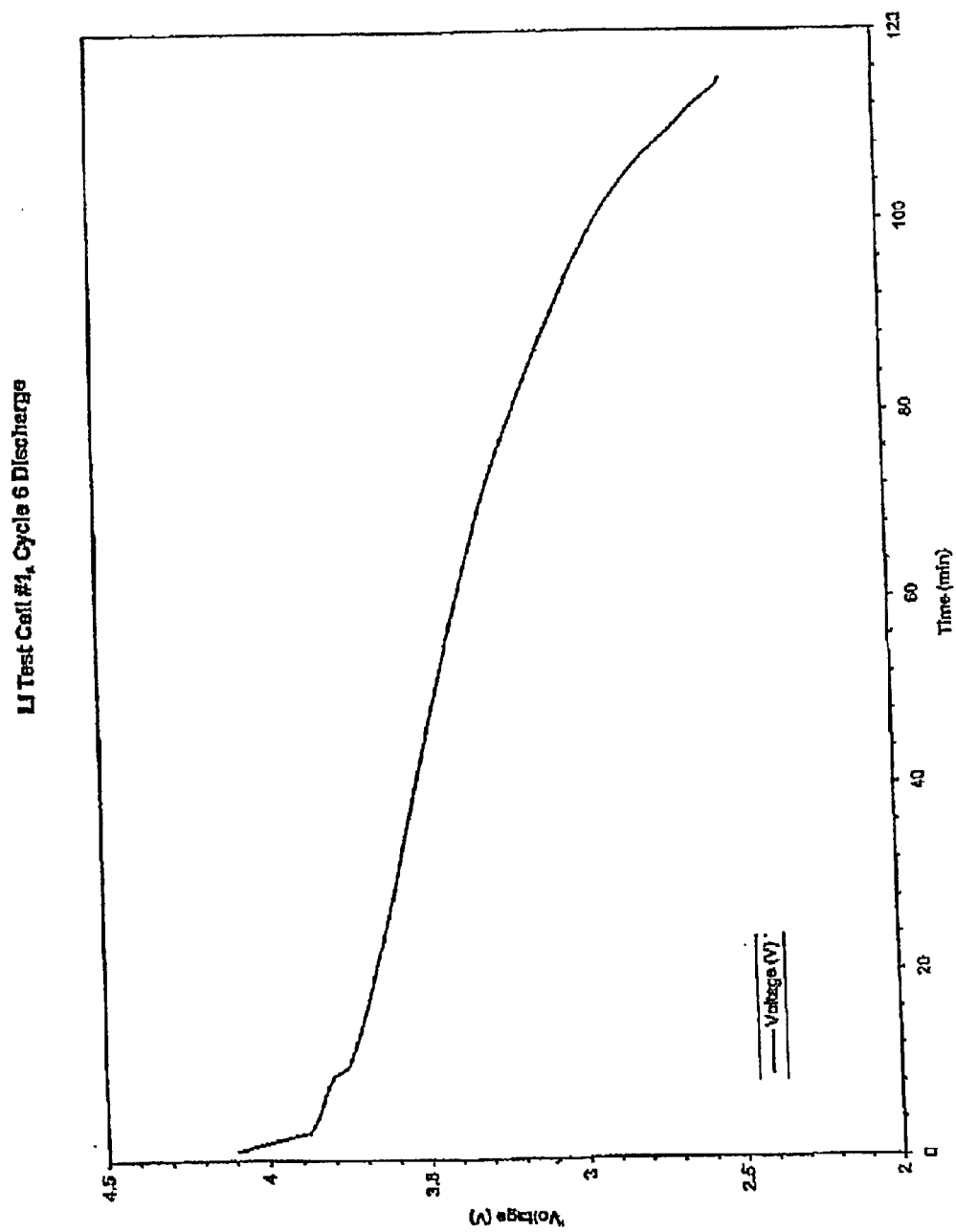
FIGURE L

US 6,790,243 B2

LITHIUM-ION CELL AND METHOD FOR ACTIVATION THEREOF

CROSS-REFERENCE TO RELATED APPLICATION

This application claims the priority of U.S. Provisional Application No. 60/181,733 filed Feb. 11, 2000.

FIELD OF THE INVENTION

This invention relates to fabrication of lithium-ion cells or batteries, and more particularly to improved activation methods therefor.

BACKGROUND OF THE INVENTION

Batteries are widely used in the modern world for portable devices. Rechargeable batteries are convenient, in that there is a very limited disposal problem and the batteries need not be purchased and installed in the portable equipment after each discharge. It is always desirable to have higher energy density (higher energy per unit volume of battery) or higher specific energy (higher energy per unit mass). Ideally, a battery or its cells should be sealed to prevent leakage and avoid contamination of the cells.

At the current state of the art, lithium polymer cells have greater specific and volumetric energy, but are not yet commercially available, partially because of unresolved problems relating to the solid electrolyte. As a practical matter, lithium-ion liquid-electrolyte cells have the highest specific and volumetric energy density. Lithium-ion liquid-electrolyte cells are widely used in laptop computers and in cell phones.

Liquid-electrolyte lithium-ion cells in the prior art are made with graphite-and-binder coated copper-foil anodes and lithium cobalt oxide/binder/conductive-carbon-coated aluminum oil cathodes. The cell is filled with an electrolyte formulation which is generally an organic aprotic liquid solvent such as a formulation containing ethylene carbonate, dimethyl carbonate, and lithium hexaflurophosphate. After the cell is filled with electrolyte, it is "activated," which generally means preparing the surfaces of the anode and cathode for use, and leaving the cell in a substantially discharged state ready for initial charge by the user. It also prepares the surface of the anode with a solid electrolyte interface as a receptacle for Li ions.

The activation of a lithium ion liquid-electrolyte cell is described by Rosamaria Fong et al. in an article entitled "Studies of Lithium Intercalation into Carbons using Non-aqueous Electrochemical Cells", published at volume 137, page 2009 of Journal of the Electrochemical Society, 1990. As described by Fong et al., the cell is filled with electrolyte and sealed. Following the sealing, it is charged at a current of 0.14 mA/cm$^2$ for 25 to 40 hours, followed by discharge of the cell at about 0.1 mA/cm$^2$. The current density is based upon the mating surface area of the smaller one of the electrodes. It has been discovered that this protocol is disadvantageous, because the pressure within the sealed cell tends to rise during the charge, and may result in cell deformation and damage. In addition, it has been found that the Fong et al. charging procedure tends toward the longer of the stated times, namely 40 hours, and the discharge tends to take greater than five hours, for a total exceeding 45 hours.

SUMMARY OF THE INVENTION

A method for fabricating an activated lithium-ion cell according to an aspect of the invention includes the step of providing an anode comprising a carbonaceous insertion compound, which preferably should contain graphite. A cathode comprising lithiated metal oxide is provided. In a preferred embodiment, the lithiated metal oxide is manganese spinel. The anode and cathode are juxtaposed, separated by a dielectric sheet which is porous to ions and acts as a medium to transport lithium ions, to thereby define a cell. The cell is filled with an electrolyte in which lithium salt is dissolved to thereby produce an electrolyte-filled cell. Such electrolytes tend to decompose into their constituents at a given voltage. Following the step of filling the cell, the cell is charged at a first current density for a period in excess of one hour. In this context, current density is measured in amperes per unit area of the cell electrode. The preferred initial charging current density is about ¼ to ⅓ mA/cm$^2$, and the duration of such charging is preferably six hours. Following the step of charging the cell at a first current density, the cell is essentially open-circuited for a further period in excess of one hour, to allow the electrolyte to be distributed through the anode. The preferred duration of the open-circuiting is eight hours. Following the step of open-circuiting, the cell is charged at a second current density, which second current density is greater than the first current density, to a voltage less than the given voltage and greater than a predetermined voltage. In a preferred mode of the method, the second current density ranges from about twice the first current density to about 100 times the first current density. When the first current density is ¼ mA/cm$^2$, the second current density is preferably ½ mA/cm$^2$. The charging at the second current density takes place until the cell voltage reaches the predetermined voltage, but not for so long a time that the cell voltage rises to the given voltage, so as to avoid decomposition of the electrolyte. The predetermined voltage is that voltage which provides the desired cell capacity. In the preferred mode, the cell is charged at the second rate until the cell reaches about 4.1 volts at which predetermined voltage the cell reaches about maximum capacity. During the charge at the second current density, the cell may produce some gas, which should be vented. Following the charging at the second current density, the cell is discharged at a third current density to a voltage which represents at least one lithium ion to sixty carbon atoms in the anode, which is about 2.5 volts. The third current density is at least ten times, and as much as a hundred times, the first current density. When the initial current density is ¼ mA/cm$^2$, the discharge current is preferably ¼ centiampere/cm$^2$. This discharge tends to reduce the energy in the cell, but leaves a sufficient density of lithium ions in the anode to support the spaced-apart plates of the graphite structure. The resulting activated cell can then be sealed into a protective metal sleeve, and is ready for charging by the user.

In a preferred mode of the invention, the step of filling the cell with electrolyte is accompanied by the step of allowing the cell to stand after the filling, and before the initial charging, for a period of at least one hour, and preferably twelve to sixteen hours, in an inert-gas, preferably argon, atmosphere.

BRIEF DESCRIPTION OF THE DRAWING

FIG. 1 is a voltage-time plot of a lithium-ion cell fabricated in accordance with an aspect of the invention, discharged at a two-hour rate.

DESCRIPTION OF THE INVENTION

It has been discovered that an improved activation procedure can both decrease the cost of manufacture of a liquid-electrolyte lithium-ion cell and increase both its reversible capacity and cycle life. In general, the activation procedure creates a capacity reserve in the anode, and reduces the excess capacity in the cathode to a "known" level, that is to say to a controlled or more-or-less constant value from cell to cell. The activation procedure also tends to equalize the electrolyte distribution within the anode, cathode and separator, and reduces or eliminates pressure rise within the cell.

A lithium ion cell according to an aspect of the invention uses an anode including carbonaceous insertion compounds. Ordinarily, such an anode includes a metallic substrate on which a graphite-containing compound is deposited, as with a binder. Natural graphite can be used, but heat-treated petroleum coke (artificially prepared graphite) is preferred. It should be noted that when petroleum coke is heat-treated, the resulting carbonaceous matter may include more or less graphite, depending upon the particulars of the preparation. Ideally, the anode would use pure graphite, but mixtures are acceptable. In a particular mode of the method, an anode of a copper foil coated with graphite and a polyvinyledene fluoride (PVDF) binder is provided with an electrical connection tab made of copper or of nickel. If nickel is used, the tab is resistance welded to the copper substrate foil.

The cathode uses a lithiated metal oxide, as known in the prior art. This material is often applied as a coating to a metal current collector or electrode. A particular cathode material which was used with an activation according to an aspect of the invention was manganese spinel $LiMn_2O_4$ and PVDF binder on aluminum foil. Other materials which should be suitable include $LiCoO_2$, $LiNiO_2$, and mixtures thereof. It should be noted that since lithium is affected by moisture, all procedures involving the lithium compounds or the cell should be performed in an extremely low humidity environment, as known in the art.

The anode and cathode are dried in a vacuum oven for eight to sixteen hours at 30° to 35° C. to drive off moisture.

The anode and cathode of the lithium-ion cell are juxtaposed (placed mutually adjacent) and spaced apart by a thin dielectric medium which is porous to lithium ions. A particular dielectric material is made of polypropylene and polyethylene plastic sold under the trade name of Celgard 2400. When the anode and cathode are juxtaposed in this manner, a cell area is defined by the juxtaposed area, which should correspond to the area of the smaller of the two electrodes, if they are of different sizes, or by the area of one of the electrodes, if they are of the same size. The active portions of the anode and cathode are heat-sealed into a commercially available aluminum-coated Surlyne plastic "bag," with the electrical connection tabs protruding from the bag. Since the electrode tabs do not make a good vacuum seal to the bag material, the electrical connections are wrapped with Surlyne plastic and heat bonded before the bag is heat-sealed. The bag is then heat-sealed along the open edge, and over the protruding Surlyne-covered tabs. The sealed bag is transferred to a glove box, and a vacuum is applied to the "fill" tube of the bag. When the bag is evacuated, the fill tube is heat-sealed at a location away from the bag.

The liquid electrolyte is known in the prior art. The liquid electrolyte is a 1 Mole $LiPF_6$ (Lithium hexafluorophosphate) in a 1:1 mixture of ethylene carbonate (EC) and dimethyl carbonate (DMC). Other formulations which contain methyl ethyl carbonate or diethyl carbonate, or both, can also be used. A hypodermic syringe is filled with the electrolyte solution, and 5 ml is introduced through the sealed fill tube into the bag. This is sufficient electrolyte to wet a 10 cm by 10 cm juxtaposed cell structure, without significant excess. The hypodermic syringe is withdrawn, leaving the needle aperture open. The step of filling the bag with electrolyte is performed within the glove box and in an argon atmosphere. The argon is used to exclude moisture when the hypodermic syringe breaks the vacuum within the bag.

The cell is allowed to stand for twelve to sixteen hours at room temperature in the argon atmosphere bag, in order to allow the electrolyte to penetrate through the layered structure of the graphite. This time is not critical, but a time greater than one hour is believed to be necessary for full penetration. Standing times of less than twelve hours is believed to reduce the cell capacity below its full capability. It may be possible to reduce the time of the standing by raising the temperature of the cell above room temperature, but the temperatures should not be raised too much in the presence of the organic solvents. Even at 30° C., some etching of the glass of the glove box has been observed, presumably due to decomposition of the electrolyte.

The lithium-ion cell at this point has been assembled using the cathode as a source of lithium and the anode as a host, with all the active material of the cell residing in the cathode from the very beginning of the assembly, which is in contrast to the discharged states of the anodes and cathodes at initial assembly in Ni—Cd and Ni—MH cells.

After the cell has been allowed to stand, a first charging is performed. This energizing procedure according to the invention is directed toward transfer of energy from the cathode to the anode, by completely filling the lattice of the carbon anode inasmuch as possible, so that the compound $Li_xC_6$ is formed, with the maximum value of "x" being 1 for graphite anodes. During the first portion of the initial charge, the reaction is decomposition of the electrolyte to form hydrogen, ethene, and propene gases, and includes the formation of a solid-electrolyte interface layer containing lithium carbonate on the surface of the anode. The solid-electrolyte interface passivates the anode and tends to prevent further decomposition of the electrolyte. This first charging has been performed in various modes of the method at 0.25 to 0.3 mA per $cm^2$ of cell area, and is continued for about six hours. Again, the exact current density is not critical, If the current density is too high, the passivation layer may not be perfectly formed on the anode. A current of about 2 $mA/cm^2$ is believed to be too high for this initial-charging. The exact time is not critical either, but the initial charging tends to move lithium into the carbon structure of the anode, and aids in increasing the cell capacity. Charging times of less than one hour have been found not to result in reaching the full capacity of the cell. The lithium ions undergo a rearrangement or redistribution to the most stable lattice positions when they enter the anode host structure during the initial charging. To the extent that this redistribution does not take place, the cell capacity is believed to be less predictable and stable from unit to unit.

As mentioned, the first charge during activation involves transfer of chemical energy from the cathode to the anode. The efficiency of this transfer is measured by the capacity of the cell in the first charging. The discharge capacity of the cell subsequent to the first charge is significantly less than the charge input in the first charge due to electrolyte decomposition and other parasitic reactions. Since the rearrangement of ions involves the creation and filling of vacancies, the solvent molecules may be co-intercalated, thereby using up anode lattice space, which in turn reduces the capacity of the anode. The coulombs expended in producing gas during the first charge do not account for all of the irreversible capacity. The voltage at which intercalation begins is a function of the carbon type in the anode, and is 0.4 volts for graphite and 1.1 volts for petroleum coke. The intercalation of lithium in graphite gives rise to stage structures of Li—C compounds such as $LiC_6$, $LiC_{12}$, $LiC_{27}$, and $LiC_{36}$. The transport processes for the intercalation reaction include diffusion of $Li_+$ in the electrolyte, diffusion through the solid-electrolyte interface or passivation layer, and finally diffusion into the carbon lattice.

After the first charging, the cell is allowed to stand, essentially open-circuited, for about eight hours, again at room temperature. This allows more diffusion of the electrolyte materials through the anode, and presumably reaches an equilibrium condition between free lithium ions and intercalated lithium ions in the anode. Allowing the cell to stand for the full open-circuit time of eight hours can result in as much as a 30% increase in cell capacity over lesser standing times. Again, it might be possible to shorten the eight hours by raising the cell temperature, subject to the decomposition problems adverted to above.

After the open-circuit standing time, the cell is again charged, this time at a greater current density than during the first charging interval. The higher current density results in some gassing, which is allowed to vent through the aperture in the side of the bag. The current density during the second charging interval is significantly greater than the first charging current density. In one mode of the method of the invention, the second charging current density was 0.6 $mA/cm^2$, about double the first charge density. The second charge density can be as much as 6 $mA/cm^2$. At higher current densities than about 6 $mA/cm^2$, the electrolyte tends to decompose, with the result of excessive gassing, and the lithium ions tend to crowd the entrances into the anode structure, which tends to raise the impedance of the cell and impede the flow of electrical current. The reactions during activation charge can be symbolized by Cathode: 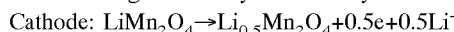

Electrolyte: 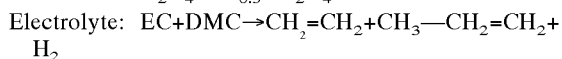

Anode: 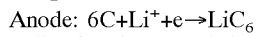

Following the second charging, the cell is discharged. The discharge rate in one mode of the method of the invention is about 3 $mA/cm^2$. The discharge is continued until the cell voltage is about 2.5 volts. At this point, the anode of the cell has developed a reserve capacity and the cathode still has an excess capacity. The property of lithium-ion cells to yield decreasing capacity at increasing discharge rates is advantageously used to keep capacity in the anode. More particularly, the lithium active material in the carbon which is dormant or inaccessible during the high-rate discharge remains in the anode at the end of the discharge period, and becomes a permanent buffer or a permanent source of lithium ions.

Following the discharge, the cell can be sealed and used at a variety of charge and discharge rates. The difference in ampere-hour capacity is directly converted Li using Faraday's law to calculate the value of x in $Li_{1-x}Mn_2O_4$.

FIG. 1 is a plot of the cell voltage versus time of a complete sealed cell activated according to the an aspect of the invention, discharged at the two-hour (C/2) rate after six charge-discharge cycles.

Lithium-ion cells made according to the method of the invention tend to have greater capacity than those made using prior-art techniques, and also tend to have better cycle performance. In addition, the cost of producing activated cells according to the invention should be lower than for such prior art as that described by Fong et al. For example, the total time for activation according to one mode of the invention includes between 12 and 16 hours for the standing with the electrolyte added, 6 hours for the first charging, 8 hours for the second standing, about 2 hours for the second charging, and about 2 hours for the discharging, for a total duration of about 28 to 32 hours. This compares favorably with the actual Fong et al. time of near 45 hours, including discharge time. The fabrication is advantageous in that the first or initial charge is performed with the cell in a vented condition so that gasses are vented away. The fabrication is also advantageous in that the discharge is at a rate sufficiently high so that mostly active lithium ions are removed from the anode, leaving behind the less active ions to act as a reserve. Also, there tends to be a balance in the capacities of the anode and cathode. The state of charge of the cathode tends not to exceed $Li_{0.95}CoO_2$ or $Li_{0.95}Mn_2O_4$, and the like. The anode tends to have a residual capacity of $Li_{0.5}C_6$. The solid-electrolyte interface or passivation layer is formed in the first charging and tends to be stable with cycling. The relatively short duration of the first discharge tends to avoid accumulation of ion-pairs in the vicinity of the anode, which in turn tends to stabilize the passivation layer. It is believed that the residual capacity in the anode tends to protect against corrosion of the copper current collector during discharge.

It should be emphasized that the above description of the method according to the invention is based on the use of laboratory techniques, which may not be useful in a production line. It is expected that details of the production fabrication will differ markedly from those set forth above. However, it is expected that factory production of lithium-ion cells according to the invention will make use of the basics set forth in the claims. A factory method, for example, would probably discharge the electrolyte into a aluminum or stainless steel cell container which is also used as the final cell holder. More particularly, the use of a glove box is not usual on a production line.

What is claimed is:

1. A method for fabricating an activated lithium-ion cell, said method comprising the steps of:

providing an anode comprising carbonaceous insertion compound;

providing a cathode comprising lithiated metal oxide;

juxtaposing said anode and cathode, separated by a dielectric sheet which is porous to ions, to thereby define a cell;

filling said cell with an electrolyte in which lithium salt is dissolved, which decomposes into its constituents at a given voltage, to thereby produce an electrolyte-filled cell;

following said step of filling said cell, charging said cell at a first current density for a period in excess of one hour;

following said step of charging said cell at a first current density, essentially open-circuiting said cell for a further period in excess of one hour;

following said step of open-circuiting, charging said cell at a second current density, which second current density is greater than said first current density, to a voltage less than said given voltage and greater than a predetermined voltage at which predetermined voltage the cell has sufficient capacity; and discharging said cell to a voltage which represents at least one lithium ion to sixty carbon atoms in the anode at a third current density, said third current density being at least ten times said first current density, to thereby produce said activated lithium-ion cell.

2. A method according to claim 1, wherein said step of charging said cell at a first current density comprises the step of charging said cell at ¼ mA per cm² for a period of six hours.

3. A method according to claim 1, wherein said step of open-circuiting said cell is performed for a period of eight hours.

4. A method according to claim 1, wherein said step of charging said cell at a second current density comprises the step of charging said cell at a current density of ½ mA per cm².

5. A method according to claim 1, wherein said step of charging said cell at a second current density is performed while allowing any gas generated in said cell to vent.

6. A method according to claim 1, wherein said step of discharging said cell is performed at a current density of ¼ centiamperes/cm².

7. A method according to claim 1, wherein said step of filling said cell with electrolyte is accompanied by the step of allowing said cell to stand after said filling for a period of at least one hour.

8. A method according to claim 7, wherein said step of allowing said cell to stand is performed in an inert-gas atmosphere.

9. A method according to claim 8, wherein said inert-gas atmosphere is an argon atmosphere.

10. A method according to claim 7, wherein said step of allowing said cell to stand is performed for a time lying between ten and twenty hours.

11. A method according to claim 1, wherein said step of providing an anode comprising carbonaceous, insertion compound includes the step of providing an anode comprising graphite.

12. A method according to claim 1, wherein said step of providing a cathode comprising lithiated metal oxide includes the step of providing a cathode comprising manganese spinel.

13. A method according to claim 1, wherein said step of charging said cell at a second current density, to a voltage less than said given voltage and greater than a predetermined voltage, includes the step of charging said cell to about 4.1 volts.

14. A method according to claim 1, wherein said step of discharging said cell to a voltage which represents at least one lithium ion to sixty carbon atoms in the anode includes the step of discharging said cell to 2.5 volts.

15. A method for fabricating an activated lithium-ion cell, said method comprising the steps of:

providing an anode comprising graphite and polyvinyledene fluoride;

providing a cathode comprising manganese spinel;

juxtaposing said anode and cathode, separated by a dielectric sheet, to thereby define a cell;

filling said cell with electrolyte, to thereby produce an electrolyte-filled cell;

allowing said electrolyte-filled cell to stand in an inert-gas atmosphere for at least 10 hours, for producing an aged cell;

charging said aged cell at a rate of ¼ mA/cm² for about six hours, to produce an initially charged cell;

open-circuiting said initially charged cell for about eight hours, to thereby produce an aged initially charged cell;

charging said aged initially charged cell to 4.1 volts at ½ mA/cm², while allowing any generated gas to vent, to thereby produce a twice-charged cell;

discharging said twice-charged cell to 2.5 volts at a rate of ¼ centiamperes per cm², to thereby produce said activated lithium-ion cell.

16. A method according to claim 15, wherein said step of filling said cell with electrolyte comprises:

the initial step of drawing a vacuum on said cell; and filling said cell with said electrolyte while maintaining said vacuum.

17. A method according to claim 15, wherein said step of allowing said electrolyte-filled cell to stand in an inert-gas atmosphere includes the step of allowing said electrolyte-filled cell to stand in an argon atmosphere.

* * * * *